United States Patent
Gordon

(10) Patent No.: US 6,758,344 B2
(45) Date of Patent: Jul. 6, 2004

(54) SELF-CLEANING FLUID FILTER SYSTEM

(75) Inventor: Robert R. Gordon, Santa Fe, NM (US)

(73) Assignee: Gordon Construction, Inc., NM (US)

( * ) Notice: Subject to any disclaimer, the term of this patent is extended or adjusted under 35 U.S.C. 154(b) by 163 days.

(21) Appl. No.: 10/082,626

(22) Filed: Feb. 21, 2002

(65) Prior Publication Data

US 2003/0155313 A1 Aug. 21, 2003

(51) Int. Cl.$^7$ .............................................. B01D 29/68
(52) U.S. Cl. .................... 210/411; 210/416.1; 210/448; 210/497.01
(58) Field of Search ................................. 210/108, 170, 210/411, 416.1, 448, 452, 456, 747, 791, 798, 497.01; 166/205, 311; 55/301, 379

(56) References Cited

U.S. PATENT DOCUMENTS

| | | | |
|---|---|---|---|
| 1,750,935 A | | 3/1930 | Maunula et al. |
| 2,046,770 A | | 7/1936 | Coberly et al. |
| 2,279,838 A | | 4/1942 | Oliver |
| 2,322,586 A | | 6/1943 | Oliver |
| 2,772,786 A | | 12/1956 | Gardee |
| 3,193,103 A | | 7/1965 | Snyder |
| 3,574,509 A | | 4/1971 | Zentis et al. |
| 3,647,071 A | | 3/1972 | Lamort |
| 4,037,661 A | * | 7/1977 | Ford ........................ 166/311 |
| 4,169,792 A | | 10/1979 | Dovel ........................ 210/82 |
| 4,210,538 A | | 7/1980 | Tantillo et al. |
| 4,210,539 A | * | 7/1980 | Shiban ........................ 210/391 |
| 4,297,209 A | | 10/1981 | DeVisser et al. |
| 4,504,288 A | | 3/1985 | Kreft |
| 4,518,501 A | | 5/1985 | Lennartz et al. |
| 4,655,910 A | | 4/1987 | Tabor |
| 4,655,911 A | | 4/1987 | Tabor |
| 4,818,420 A | | 4/1989 | Mims |
| 4,977,958 A | | 12/1990 | Miller |
| 5,228,993 A | * | 7/1993 | Drori ........................ 210/332 |
| 5,246,580 A | | 9/1993 | Stedfeldt |
| 5,370,791 A | | 12/1994 | Lescovich et al. |
| 5,401,396 A | | 3/1995 | Lescovich et al. |
| 5,490,924 A | * | 2/1996 | Macia et al. ............. 210/257.1 |
| 5,690,824 A | | 11/1997 | Stuth ..................... 210/333.01 |
| 5,910,249 A | | 6/1999 | Kopp et al. ................. 210/617 |
| 6,139,727 A | | 10/2000 | Lockwood |
| 6,155,430 A | | 12/2000 | Goodman |
| 6,231,764 B1 | | 5/2001 | Wilkins ..................... 210/297 |
| 6,283,305 B1 | | 9/2001 | Maeda et al. ............... 210/356 |

* cited by examiner

Primary Examiner—Joseph Drodge
(74) Attorney, Agent, or Firm—Knobbe, Martens, Olson & Bear, LLP

(57) ABSTRACT

A self-cleaning, back-washable filter apparatus and method for use with a pumping apparatus which is lowered into a well casing. The filter apparatus includes a filter basket having a manifold with several tubes extending therefrom. A filter sock encases at least a portion of the filter basket to block sand or other solid particles from entry into the pump intake. Pressurized gas or fluid is directed to the manifold and then through perforations or jets distributed along the length of the tubes. Bursts of the pressurized gas are directed from the perforations or jets to the interior of the filter apparatus and then sprayed from the perforations or jets in an outwardly direction against interior surfaces of the filter sock. Air or fluid bursts from the perforations impinge upon the interior surfaces of the filter sock and dislodge or expel entrapped particulate material.

35 Claims, 4 Drawing Sheets

SELF-CLEANING FLUID FILTER SYSTEM

BACKGROUND OF THE INVENTION

1. Field of the Invention

The invention relates to a filter apparatus and more particularly to a self-cleaning, back-flushable filter for removing particulate material from a pump intake.

2. Description of the Related Art

Submersible pumps are often lowered into fluid supplies such as those found in well casings or ponds in order to remove the fluid that is found there. Often, the fluid contains sand and other abrasive particles that are a constant cause of inefficiency in and potential failure of the pumping systems. For example, sand can cause severe damage to the pump and valves in the pumping system.

Many types of filters have been designed for use with submersible pumps. Such filters have typically included a filter element designed to screen particulate material from the pump intake. However, the particulate material often becomes entrapped in the filter element. The quantity of particulate material collected on the filter element is directly proportional to the to the pressure drop that occurs across the filter element. Since an excessive pressure drop across the filter element can significantly reduce fluid flow, the filter element must be periodically changed or cleaned. Often, this is done by removing the submersible pump from the fluid and removing the filter element. This can be a timely and inconvenient process. Pumps with intricate backwashing systems have been designed, but these are often expensive and cannot be used to retrofit existing systems. As a result, many pumps are generally operated without any filter and therefore experience early pump failure and extensive and costly down time.

There exists, therefore, a continuing need for further improvements in fluid filter devices having a self-cleaning filter element. There further exists the need to have a relatively simple and reliable manner of backwashing filter elements used with an existing pump.

SUMMARY OF THE INVENTION

In one embodiment, the invention is a filter apparatus for use with a submersible pump. The filter apparatus includes a filter element, a supply line for delivery of a flushing medium, and a filter basket, wherein the filter element extends about at least a portion of the filter basket. The filter basket includes a manifold, including a flushing medium supply opening in a first surface thereof for receiving the supply line, a plurality of apertures in a second surface of the manifold, and an internal chamber fluidly connecting the flushing medium supply opening with the plurality of apertures. The filter basket also includes a plurality of tubes, wherein each tube of the plurality of tubes extends from one of the plurality of apertures and includes a plurality of perforations such that a flushing medium may flow from the supply line through the internal chamber into the plurality of tubes and through the perforations to backflush the filter element. The filter apparatus can further include a submersible pump with an electrical motor within the filter basket.

Another embodiment of the invention is a system for cleaning a filter apparatus used for screening the intake of a pump. The system includes a supply tank for storing a pressurized flushing medium, a supply line for delivery of the flushing medium, and a filter apparatus. The filter apparatus includes a filter element, a supply line for delivery of a flushing medium, and a filter basket, wherein the filter element extends about at least a portion of the filter basket. The filter basket includes a manifold, including a flushing medium supply opening in a first surface thereof for receiving the supply line, a plurality of apertures in a second surface of the manifold, and an internal chamber fluidly connecting the flushing medium supply opening with the plurality of apertures. The filter basket also includes a plurality of tubes, wherein each tube of the plurality of tubes extends from one of the plurality of apertures and includes a plurality of perforations such that a flushing medium may flow from the supply line through the internal chamber into the plurality of tubes and through the perforations to backflush the filter element. The filter apparatus can further include a submersible pump with an electrical motor within the filter basket.

Another embodiment of the invention is a method of flushing a filter apparatus used to screen the intake of a pump. The method includes encasing a pump suction inlet in a filter basket having a plurality of tubes, wherein each tube has at least one perforation therein. The method further includes surrounding at least a portion of the filter basket with a filter element such that a fluid to be pumped passes through the filter element to reach the pump suction inlet, and directing a flushing medium out of the perforations such that the flushing fluid is sprayed in an outwardly direction against interior surfaces of the filter element to dislodge or expel entrapped particulate material.

BRIEF DESCRIPTION OF THE DRAWINGS

These and other objects and features of the invention will become more fully apparent from the following description and appended claims taken in conjunction with the following drawings, wherein like reference numerals indicate identical or functionally similar elements.

DETAILED DESCRIPTION OF THE INVENTION

Embodiments of the invention will now be described with reference to the accompanying Figures, wherein like numerals refer to like elements throughout. The terminology used in the description presented herein is intended to be interpreted in its broadest reasonable manner in accordance with its ordinary use in the art and in accordance with any overt definitions provided below.

Figure 1:
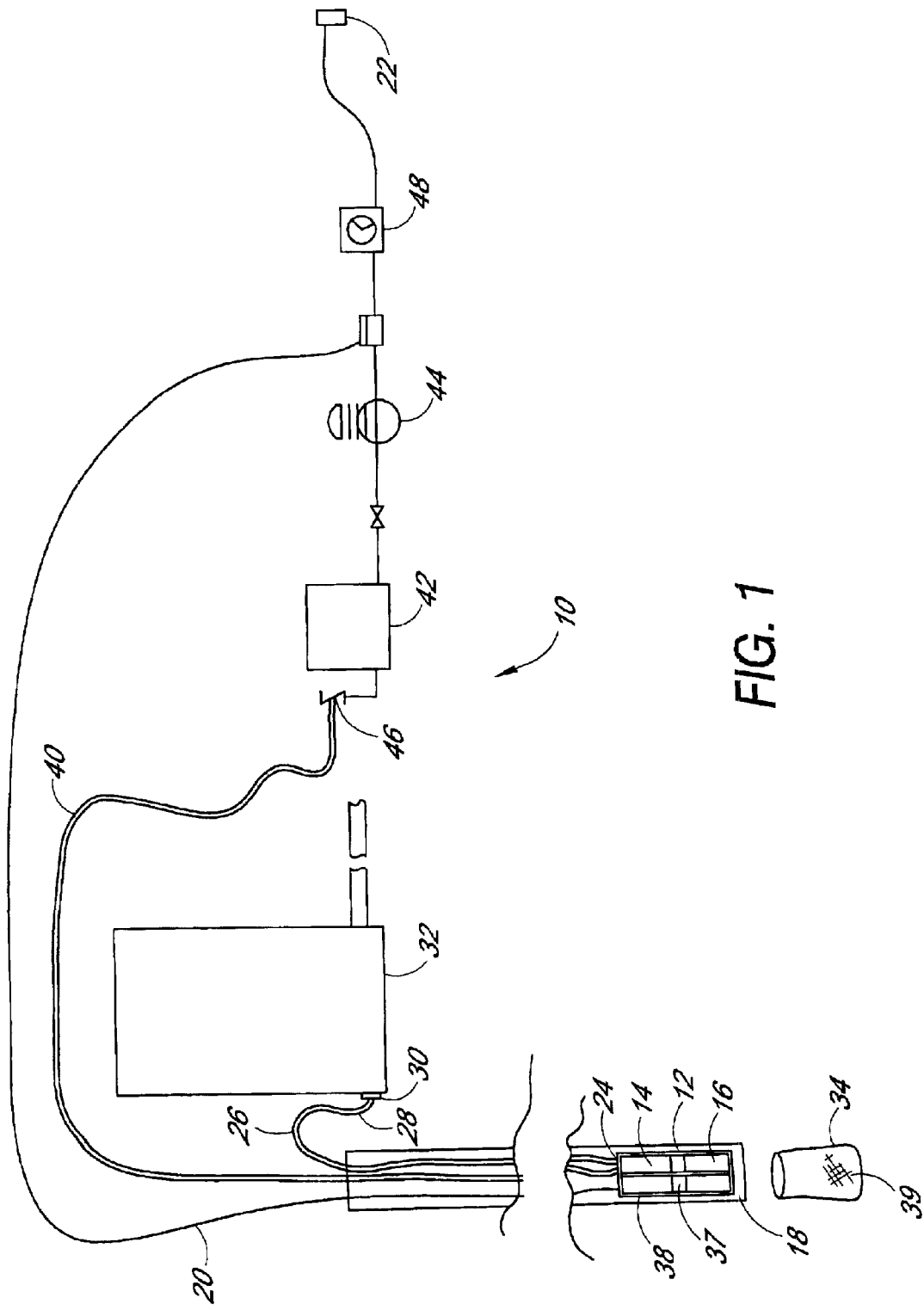
FIG. 1 is a schematic diagram of one embodiment of a system for pumping fluid using a self-cleaning filter apparatus according to one aspect of the invention.

Referring now to FIG. 1, a system 10 for pumping fluid from a well using a self-cleaning filter apparatus 12 is illustrated. The filter apparatus 12 encloses a submersible pump 14 in combination with an electric motor 16. The submersible pump 14 and electric motor 16 are preferably contained in a common housing and can be of conventional design. In one embodiment, the filter apparatus 12 and pump 14 are lowered into a typical well casing 18. An electrical supply line 20 connects an appropriate electrical power source 22 to the electric motor 16. A first end 24 of a pump discharge line 26 connects to the submersible pump 14. A second end 28 of the pump discharge line 26 is attached to a fitting 30 on a typical fluid tank 32 used for storing the pumped fluid. In operation, the filter apparatus 12 substantially prevents abrasive materials, such as sand, of a size that is equal to or greater than a predetermined size from entering the submersible pump 14. Although this embodiment illustrates the filter apparatus 12 being used with a system 10 to pump and filter water from a well casing 18, one skilled in the art will understand that the filter apparatus 12 can be used to filter other liquids, such as oil, gas, sewage, chemicals, industrial waste, and can be used to pump 14 liquids from ponds, streams, dewatering projects or other sources to any desired collection location.

The filter apparatus 12 has a filter element 34 (removed for clarity purposes) to screen out unwanted particles and abrasive materials such as sand and the like. In one embodiment, the filter material is a filter sock 34 made of a synthetic fabric with 10 micron openings. One skilled in the art will understand that other filter elements and/or different sized fabric openings designed to filter particulate material such as sand can also be used. For example, the filter element can be a tube or filter material wrapped around the filter apparatus. During the filtering operation, some of the particulate matter that the filter sock 34 screens out collects on the filter fabric. The quantity of particulate matter collected on the fabric of the filter sock 34 directly affects the pressure drop across the filter sock 34. Since an excessive pressure drop across the filter sock 34 can significantly reduce fluid flow and thereby adversely impact the performance of the pump 14, the filter sock 34 must be periodically changed or appropriately backwashed or flushed to clean the accumulated particulate material therefrom. One option, when the performance of the pump 14 drops to an unacceptable level, is to pull the pump 14 and filter apparatus 12 out of the well casing 18 and remove the filter sock 34 for cleaning or replacement. However, a more convenient and time saving remedy is available through back-washing or reverse-flushing the filter sock 34.

In one embodiment, such back-washing is accomplished by directing bursts of air to the interior of the filter apparatus 12 and spraying this air forcefully in an outwardly direction against interior surfaces of the filter sock 34. Such spraying action is created by use of relatively thin and elongated tubes 38 which have minute perforations or jets distributed along their lengths, and which are fed from an air source as will be more fully discussed below with respect to FIG. 2. Air bursts from the perforations impinge upon the interior surfaces of the filter sock 34 and dislodge or expel entrapped particulate material. The diameter of the tubes 38 determines the spacing between a pump suction inlet 37 on the pump 14 and the filter sock 34 by supplying a separation gap equal to the diameter of the tubes 38 between the filter sock 34 and the pump suction inlet 37. The tubes 38 prevent the filter sock 34 from being sucked into the pump fluid inlet. This permits substantially the entire area of the filter sock 34 to be utilized for filtering fluid flow.

The filter sock 34 is wrapped with an outer layer 39 made from a metal or plastic mesh-like material or perforated sheet material. The outer layer 39 protects the filter sock 34 from tearing while inserting the pump 14 and filter apparatus 12 in the well casing 18 or from snagging on rocks or sticks when the pump 14 is used in ponds or streams. The outer layer 39 also limits deformation of the filter sock 34 from the force of the blast of air during the cleaning process.

A conduit, such as a supply hose 40, is connected to the filter apparatus 12 for supplying a pressurized gas or liquid used to flush the filtered particles screened by the filter apparatus 12. In one embodiment, the supply hose 40 connects an air supply tank 42 to the filter apparatus 12. Although the following embodiment uses air, other gases, such as carbon dioxide, nitrogen, and the like, can be used. Alternately, a fluid, such as water can be used to flush the filter apparatus 12. An air compressor 44 pressurizes the air in the air supply tank 42. In one embodiment, an air pressure relief valve (APRV) 46 is located in the air supply hose 40 between the air supply tank 42 and the filter apparatus 12. When it is desired to clean the filter, an operator turns on the compressor 44. When the pressure in the air supply tank 42 reaches the appropriate setting on the APRV 46, the APRV 46 opens to allow a burst of air to be directed to the interior of the filter apparatus 12. In another embodiment, a manual valve is placed in the air supply hose 40 between the air supply tank 42 and the filter apparatus 12 allowing an operator to provide a burst of air to the interior of the filter apparatus 12.

A control panel 48 may be provided that cooperates with the filter apparatus 12 such that the frequency of flushing can be programmed or occur in response to any desired signal. This allows the user to have greater flexibility in selecting when a flushing cycle is to be performed. Also, the allowable time for flushing can be pre-established and programmed into the control panel. Such a program is not necessary to perform any of the above cleaning procedures, since a user may effect such a cleaning procedure manually or semi-automatically. Use of such a control panel 48, however, allows for programming and automatic cleaning to suit a particular installation.

Figure 2:
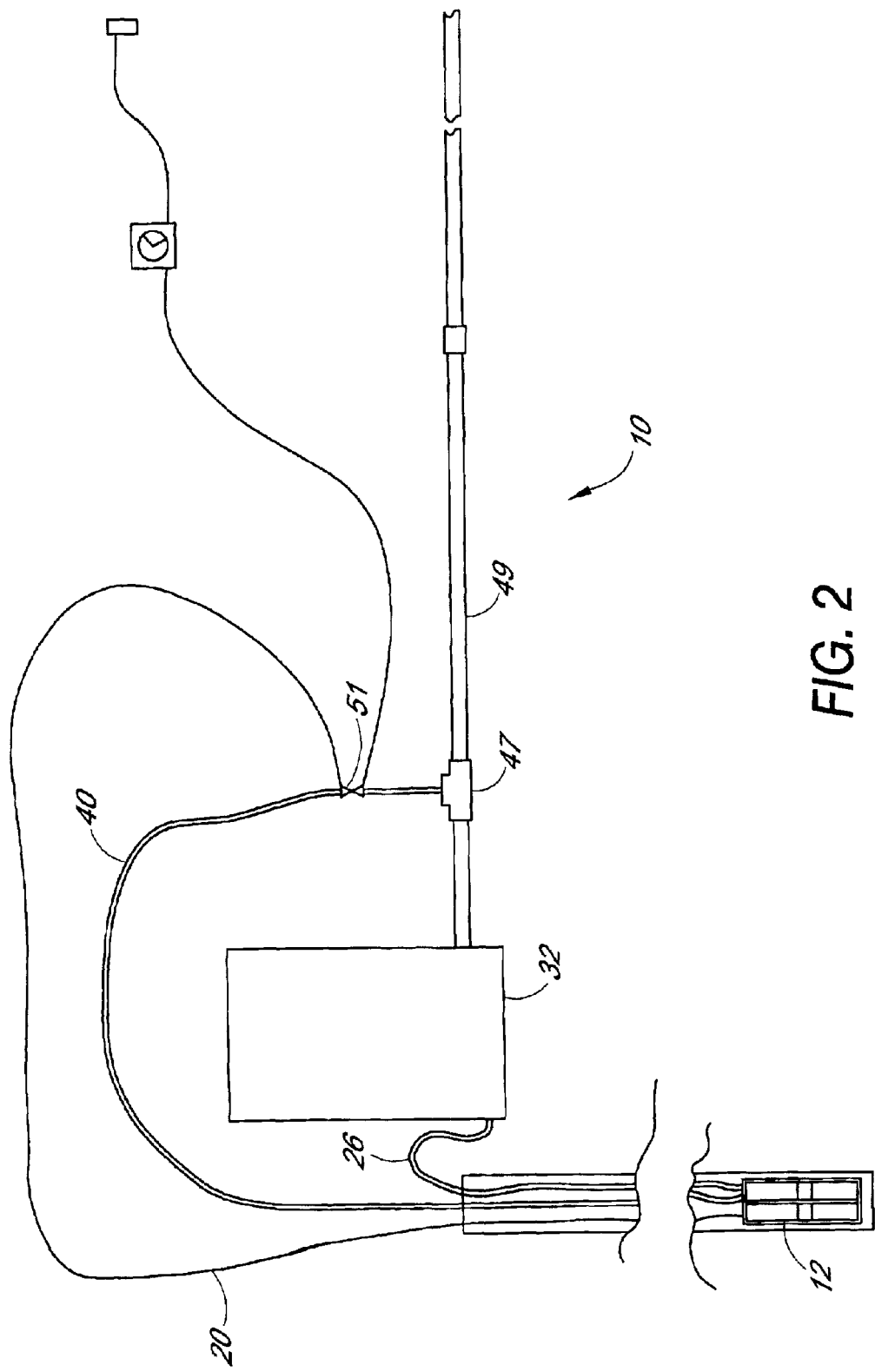
FIG. 2 is a schematic diagram of another embodiment of a system using the self-cleaning filter apparatus of FIG. 1 which uses the fluid being pumped to flush the filter apparatus.

FIG. 2 illustrates another embodiment of the system using the filter apparatus 12. The supply hose 40 can supply fluid from the tank 32 to provide a burst of fluid into the interior of the filter apparatus 12. A tee valve 47 in an output line 49 leading from the tank 32 can direct fluid back to the filter apparatus 12. A solenoid valve 51 is located in the supply hose 40 between tee valve 47 and the filter apparatus 12. The solenoid valve 51 can be controlled to provide flushing fluid flow to the apparatus at desired intervals. Additionally, the solenoid valve 51 can have a manual operator thereon to allow manual operation of the valve or the supply hose 40 can have a bypass (not shown) with a manual valve bypassing the solenoid valve 51 allowing an operator to control the flushing intervals.

Figure 3:
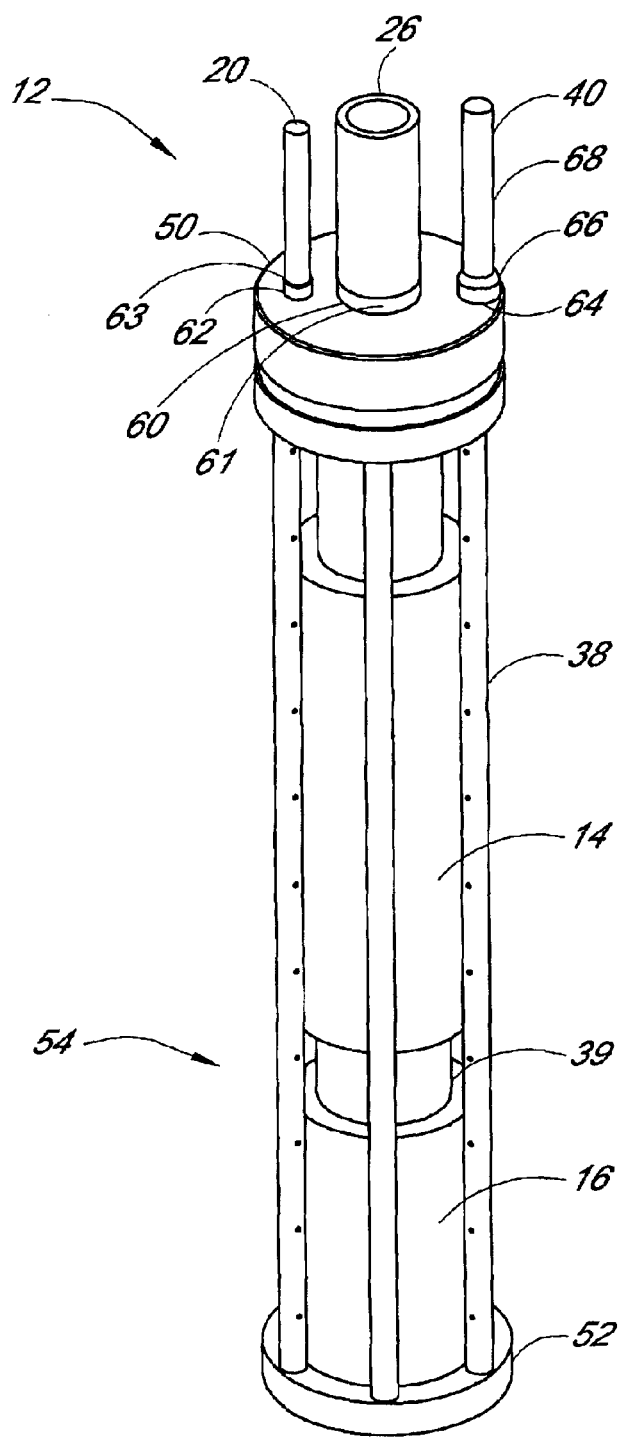
FIG. 3 is a perspective view of the filter apparatus of FIG. 1.

FIG. 3 illustrates one embodiment of the filter apparatus 12, shown without the filter sock 34, for clarity. The filter apparatus 12 has several hollow tubes 38 extending between a circular top manifold 50 and a circular bottom plate 52. In one embodiment, the tubes 38, the top manifold 50 and bottom plate 52 are made of polyvinyl chloride. However, other suitable materials such as fiberglass, metal and plastics can be used. In one embodiment, the tubes 38 are heat fused to the top manifold 50. Alternately, the tubes 38 are glued, threaded, welded or attached by screws to the top manifold 50. The bottom plate 52 is heat fused to the tubes 38. Alternately, the bottom plate 52 is welded, glued or removably attached to the tubes 38 using screws. In the embodiment illustrated in FIG. 3, the filter apparatus 12 has six tubes 38 substantially evenly spaced around the outer circumference of the top manifold 50 and the bottom plate 52 to form a substantially cylindrical filter basket 54. Alternately, more or fewer tubes 38 can be used. The top manifold 50 and bottom plate 52 have a diameter large enough so that the submersible pump 14 and motor 16 will fit in the cavity 56 formed by the filter basket 54. One skilled in the art will appreciate that various sizes of filter baskets 54 can be manufactured to house different sizes and shapes of the pump 14 and motor 16 that will be received therein. For example, filter baskets 54 can be manufactured with internal diameters of, for example, 4 inches, 6 inches, 8 inches, 10 inches and 12 inches. Different numbers of tubes 38 can be used as desired, taking into account such factors as the size of pump 14 to be used inside the filter apparatus 12 and the pressure differential across the filter sock 34. For example, more tubes 38, such as 8 to 12, can be used in larger filter baskets 54 associated with larger pumps.

The top manifold 50 has a first hole 60 therein through which the pump discharge line 26 passes. A seal 61 extends around the pump discharge line 26 so as to fill any space between the line 26 and the periphery of the first hole 60. The top manifold 50 has a second hole 62 therein through which the electrical supply line 20 passes. A seal 63 is installed around the electrical supply line 20 so as to fill any empty space between the line 20 and the periphery of the second hole 62. The top manifold 50 also has a third opening 64 in a top surface thereof with an adapter 66 located within the opening 64 to receive a first end 68 of the air supply hose 40. The adapter 66 can be a threaded brass fitting for attaching the air supply hose 40 to the top manifold 50. The adapter 66 can also be made from other materials, such as plastic, metal and the like.

Figure 4:
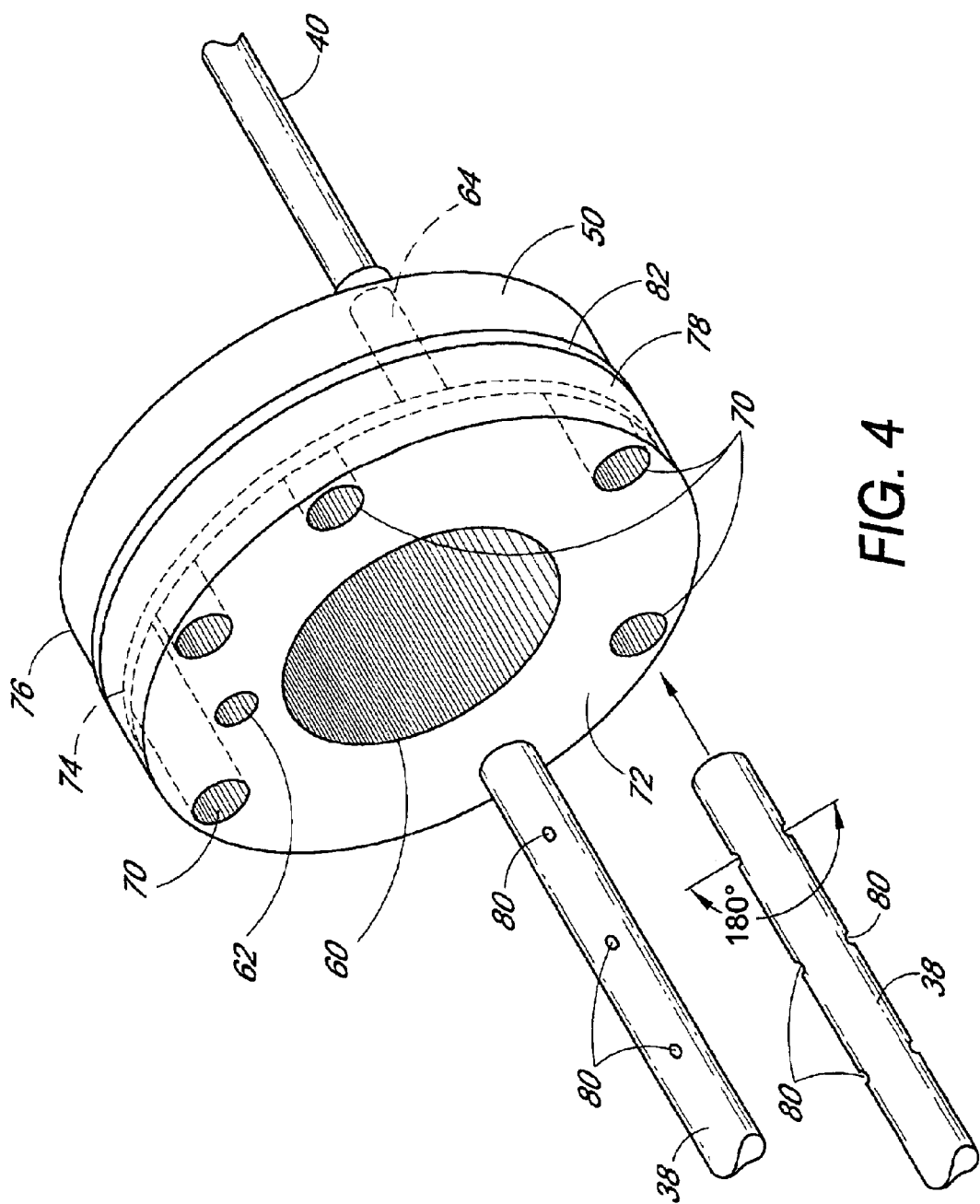
FIG. 4 is a perspective view of a manifold of the filter apparatus of FIG. 1, illustrating the openings and internal chamber in the manifold.

In FIG. 4 it is seen that the top manifold 50 has six tube apertures 70 located in the lower side 72 thereof. These apertures are each configured to receive a corresponding hollow tube 38. An internal concentric chamber 74 is located in the top manifold 50 to fluidly connect the third opening 64, to which the air supply hose 40 is attached, with the tube apertures 70 such that pressurized air from the air supply hose 40 passes into the hollow tubes 38. In one embodiment, the top manifold 50 can be made by aligning an upper plate 76 and a lower plate 78 to place corresponding grooves (not shown) on each plate in proper alignment, and then heat fusing the plates 76 and 78 together so as to form the internal chamber 74. Of course other conventional methods of making the manifold 50 will be readily apparent to one skilled in the art.

Each tube 38 contains a number of perforations or jets 80 therein. When pressurized air is inserted into the tubes 38, the air escapes out the perforations 80. In one embodiment, the perforations 80 are arranged in two rows spaced about 180 degrees apart around the tube 38 to direct the burst of air along the inner surface of the filter sock 34. Alternatively, the rows of perforations 80 can be placed at angles less than 180 degrees apart to direct the air blasts more directly against the filter sock 34. The perforations 80 are longitudinally spaced along the hollow tubes 38 to provide air bursts along substantially the entire length of the hollow tubes 38. In one embodiment, the perforations 80 are spaced approximately every three inches along the tube 38 of about three inches between perforations, however, other spacing can be used.

The filter sock 34 (See FIG. 1) is shaped like a tube sock. The diameter of the filter sock 34 is such that it may be snugly slid over the filter basket 54 formed by the tubes 38. The length of the filter sock 34 is at least long enough to cover the tubes 38. The upper perimeter of the filter sock 34 preferably is sealed in a groove 82 in the perimeter of the manifold 50 by a suitable, easily removable tape, band, strap or the like to prevent particles from gaining access to the interior of the filter basket 54 through an open end of the filter sock 34. In an embodiment where the filter element is a tube or the like, a lower perimeter of the filter element can be sealed in a similar manner.

The filter apparatus 12 (FIG. 1) is installed around the pump 14 and motor 16 by removing the bottom plate 52 and sliding the pump and motor into the filter basket 54. The pump discharge line 26 is fed through the first hole 60 in the manifold. The electrical supply line 20 is fed through the second hole 62 in the manifold 50. The air supply hose 40 is attached to the adapter 66 on the manifold 50. The seals 61 and 63 are then installed on the electrical supply line 20 and pump discharge line 26. The bottom plate 52 is then attached to the tubes 38 and the filter sock 34 is slid over the filter basket 54. In another embodiment, the bottom plate 52 can be a ring with an opening therein. In this embodiment, the bottom ring 52 can be permanently attached to the tubes as described above. The pump 14 is inserted into the filter basket 54 through the opening. A seal on the bottom ring 52 conforms to an outer surface of the pump 14. The seal can be an o-ring or a flashing capable of creating a seal with various sizes of pumps.

In operation, the filter apparatus 12 containing the pump 14 and motor 16 is lowered into a fluid containing particulate material that is to be pumped. The fluid is sucked through the filter sock 34 that is stretched around the filter basket 54 which removes the particulate matter. The fluid then passes into the confines of the filter basket 54 and then into the fluid inlet of the pump 14. Particulate material removed from the fluid is collected on the outer surface of the filter sock 34. The outer surface of the filter sock 34 must be periodically flushed. To flush the filter sock 34, air is directed down the air supply hose 40 and into the internal chamber 74 of the top manifold 50. The air is then distributed in the chamber 74 to each of the hollow tubes 38. The air then escapes out of the hollow tubes 38 through the perforations 80 and is directed against the inner surface of the filter sock 34. The flow of air in the reverse direction removes the particulate material that has collected on the outer surface of the filter sock 34.

In another embodiment, the filter apparatus 12 can be placed on the end of a pump suction line that is lowered into the fluid to be pumped. In this embodiment, the design of the filter basket 54 is substantially the same, except that no electrical supply line passes through the manifold and the pump suction line passes through the manifold instead of the pump discharge line.

In another embodiment for use in pumping from fluid supplies containing flammable fluids, the filter basket and the supply hose can be made from flame and heat resistant materials. If a fire were to break out in the fluid supply, the system can be used to deliver an extinguishing agent, such as carbon dioxide.

The invention overcomes the longstanding problem of providing a self-cleaning filter element that can be used with existing submersible pumps. A submersible pump can be inserted into the filter basket and then placed into a fluid source such that particulate material is screened from the fluid by a filter element. The screened particulate material can then be dislodged or expelled from the surface of the filter element without having to remove the filter element from the fluid source.

The foregoing description details certain embodiments of the invention and describes the best mode contemplated. Specific parts, shapes, materials, functions and modules have been set forth. However, a skilled technologist will realize that there are many ways to fabricate the system of one embodiment of the invention, and that there are many parts, components, modules or functions that may be substituted for those listed above. While the above detailed description has shown, described, and pointed out fundamental novel features of the invention as applied to various embodiments, it will be understood that various omissions and substitutions and changes in the form and details of the components illustrated may be made by those skilled in the art, without departing from the spirit or essential characteristics of the invention. The scope of the invention should therefore be construed in accordance with the appended Claims and any equivalents thereof.

What is claimed is:

1. A filter apparatus for use with a pump, said filter apparatus comprising:
   a filter element;
   a supply line for delivery of a flushing medium;
   a filter basket, wherein said filter element extends about at least a portion of said filter basket, and wherein said filter basket comprises:
      a manifold, comprising:
         a flushing medium supply opening in a first surface thereof for receiving said supply line;
         a plurality of apertures in a second surface of said manifold; and
         an internal chamber located between said first surface and said second surface and fluidly connecting said flushing medium supply opening with said plurality of apertures; and
      a plurality of tubes, wherein each tube of said plurality of tubes extends from one of said plurality of apertures and includes a plurality of perforations such that a flushing medium may flow from said supply line through the internal chamber into the plurality of tubes and through said perforations to backflush said filter element.

2. The filter apparatus of claim 1, further including a submersible pump with an electrical motor within the filter basket.

3. The filter apparatus of claim 2, wherein the manifold further comprises a first hole therein, wherein a pump discharge line passes through said first hole and connects to said pump.

4. The filter apparatus of claim 2, wherein the manifold further comprises a second hole therein, wherein an electrical supply line passes through said second hole and is electrically connected to said motor.

5. The filter apparatus of claim 1, wherein the filter basket is substantially cylindrical.

6. The filter apparatus of claim 1, wherein the supply line is configured to deliver a flushing medium selected from a group consisting of air, water, nitrogen, carbon dioxide or mixtures thereof.

7. The filter apparatus of claim 1, wherein the filter element is a filter sock.

8. The filter apparatus of claim 1, wherein each tube comprises two rows of perforations along the length of the tube, said rows positioned about 180 degrees apart.

9. The filter apparatus of claim 1, wherein the filter basket comprises six tubes.

10. The filter apparatus of claim 1, further including a bottom plate removably attached to a lower end of the plurality of tubes.

11. The filter apparatus of claim 1, further including a bottom plate with an opening therein through which a submersible pump can be inserted.

12. The filter apparatus of claim 1, wherein the manifold further comprises a first hole therein, and wherein a pump suction line passes through said first hole and connects to a pump.

13. A filter apparatus for use with a submersible pump, said filter apparatus comprising:
   a filter element;
   a filter basket, wherein said filter element extends about at least a portion of said filter basket, and wherein said filter basket comprises:
      a manifold comprising an internal chamber fluidly connecting a flushing medium supply opening with a plurality of apertures; and
      a plurality of tubes, wherein each tube of said plurality of tubes extends from one of said plurality of apertures so as to form a substantially cylindrical filter basket, and wherein said tubes have a plurality of perforations for directing a flushing medium to impinge upon an interior surface of the filter element to dislodge or expel particulate material entrapped on the filter element.

14. The filter apparatus of claim 13, further including a submersible pump and an electrical motor within the filter basket.

15. The filter apparatus of claim 13, wherein each tube comprises two rows of perforations along the length of the tube, said rows positioned about 180 degrees apart.

16. The filter apparatus of claim 13, wherein the manifold further comprises a first hole therein, wherein a pump discharge line passes through said first hole and connects to said pump.

17. The filter apparatus of claim 13, wherein the filter element is a synthetic filter sock.

18. The filter apparatus of claim 13, wherein the tubes are heat fused to the manifold.

19. The filter apparatus of claim 13, wherein the tubes are welded to the manifold.

20. The filter apparatus of claim 13, wherein the tubes are glued to the manifold.

21. The filter apparatus of claim 13, wherein the filter basket comprises six tubes.

22. The filter apparatus of claim 13, further including a bottom plate removably attached to a lower end of the plurality of tubes.

23. The filter apparatus of claim 13, further including a bottom plate with an opening therein through which a submersible pump can be inserted.

24. A system for cleaning a filter apparatus used for screening the intake of a pump, said system comprising:
   a supply tank for storing a pressurized flushing medium;
   a supply line for delivery of the flushing medium;
   a filter apparatus comprising:
      a filter element;
      a filter basket, wherein said filter element extends about at least a portion of said filter basket, and wherein said filter basket comprises:
         a manifold, comprising:
            a flushing medium supply opening in a first surface thereof for receiving said supply line;
            a plurality of apertures in a second surface of said manifold; and
            an internal chamber located between said first surface and said second surface and fluidly connecting said flushing medium supply opening with said plurality of apertures; and
         a plurality of tubes, wherein each tube of said plurality of tubes extends from one of said plurality of apertures and includes a plurality of perforations for directing the flushing medium to impinge upon an interior surface of the filter element to dislodge or expel particulate material entrapped on the filter element.

25. The system of claim 24, further including a submersible pump with an electrical motor within the filter basket.

26. The system of claim 24, wherein the filter basket is substantially cylindrical.

27. The system of claim 24, wherein the supply line is configured to deliver a flushing medium selected from a group consisting of air, water, nitrogen, carbon dioxide or mixtures thereof.

28. The system of claim 24, wherein the filter element is a filter sock.

29. The system of claim 24, wherein each tube comprises two rows of perforations extending along the length of the tube, said rows positioned about 180 degrees apart.

30. The system of claim 24, further including a bottom plate removably attached to a lower end of the plurality of tubes.

31. The filter apparatus of claim 24, further including a bottom plate with an opening therein through which a submersible pump can be inserted.

32. The filter apparatus of claim 24, wherein the manifold further comprises a first hole therein, and wherein a pump suction line passes through said first hole and connects to a pump.

33. A filter apparatus for use with a pump, said filter apparatus comprising:
   a filter element;
   a supply line for delivery of a flushing medium;
   a filter basket;
   a submersible pump with an electrical motor within said filter basket,
   wherein said filter element extends about at least a portion of said filter basket, and wherein said filter basket comprises:
      a manifold, comprising:
         a flushing medium supply opening in a first surface thereof for receiving said supply line;
         a plurality of apertures in a second surface of said manifold; and
         an internal chamber formed between said first surface and said second surface fluidly connecting said flushing medium supply opening with said plurality of apertures; and
      a plurality of tubes, wherein each tube of said plurality of tubes extends from one of said plurality of apertures and includes a plurality of perforations such that a flushing medium may flow from said supply line through the internal chamber into the plurality of tubes and through said perforations to backflush said filter element.

34. The filter apparatus of claim 33, wherein the manifold further comprises a first hole therein, and wherein a pump discharge line passes through said first hole and connects to said pump.

35. The filter apparatus of claim 33, wherein the manifold further comprises a second hole therein, and wherein an electrical supply line passes through said second hole and is electrically connected to said motor.

* * * * *